United States Patent
Lim et al.

(10) Patent No.: US 10,398,976 B2
(45) Date of Patent: Sep. 3, 2019

(54) DISPLAY CONTROLLER, ELECTRONIC DEVICE, AND VIRTUAL REALITY DEVICE

(71) Applicant: SAMSUNG ELECTRONICS CO., LTD., Suwon-si (KR)

(72) Inventors: Kyu Tae Lim, Yongin-si (KR); Chi Ho Cha, Suwon-si (KR); Hwa Hyun Cho, Seoul (KR); Yoon Ho Ko, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 15/391,983

(22) Filed: Dec. 28, 2016

(65) Prior Publication Data

US 2017/0340969 A1     Nov. 30, 2017

(30) Foreign Application Priority Data

May 27, 2016  (KR) .......................... 10-2016-0065657
Jun. 24, 2016  (KR) .......................... 10-2016-0079305

(51) Int. Cl.
| | | |
|---|---|---|
| *A63F 13/52* | (2014.01) | |
| *G06F 3/00* | (2006.01) | |
| *G06F 3/01* | (2006.01) | |
| *H04N 5/232* | (2006.01) | |
| *H04N 7/01* | (2006.01) | |
| *A63F 13/26* | (2014.01) | |
| *G02B 27/01* | (2006.01) | |
| *A63F 13/213* | (2014.01) | |

(52) U.S. Cl.
CPC .............. *A63F 13/52* (2014.09); *A63F 13/26* (2014.09); *G02B 27/0172* (2013.01); *G06F 3/005* (2013.01); *G06F 3/011* (2013.01); *G06F 3/012* (2013.01); *G06F 3/013* (2013.01); *H04N 5/23238* (2013.01); *H04N 7/0127* (2013.01); *A63F 13/213* (2014.09); *A63F 2300/8082* (2013.01); *G02B 2027/0136* (2013.01)

(58) Field of Classification Search
CPC ........... G09G 2340/0435; G09G 5/346; H04N 7/0127; G06T 3/20
See application file for complete search history.

(56) References Cited

U.S. PATENT DOCUMENTS

| | | | |
|---|---|---|---|
| 8,406,511 B2 | 3/2013 | Schlosser et al. | |
| 9,210,301 B2 | 12/2015 | Seki et al. | |
| 2003/0067420 A1* | 4/2003 | Ernst | G06F 17/3028 345/1.3 |
| 2004/0027313 A1* | 2/2004 | Pate | G09G 3/001 345/30 |
| 2004/0027363 A1* | 2/2004 | Allen | G09G 3/002 345/698 |

(Continued)

FOREIGN PATENT DOCUMENTS

| | | |
|---|---|---|
| JP | 8-191419 A | 7/1996 |
| WO | 2014/172151 A1 | 10/2014 |

*Primary Examiner* — Jeffery A Brier
(74) *Attorney, Agent, or Firm* — Sughrue Mion, PLLC

(57) ABSTRACT

A display controller includes a frame rate converter creating a second reference image having a second frame rate higher than a first frame rate of a first reference image, based on the first reference image, a buffer storing the second reference image, and an image processor creating an output image by selecting at least a portion of the second reference image.

13 Claims, 16 Drawing Sheets

(56) References Cited

U.S. PATENT DOCUMENTS

| | | | |
|---|---|---|---|
| 2004/0028293 A1* | 2/2004 | Allen | G09G 3/002 |
| | | | 382/300 |
| 2005/0168492 A1 | 8/2005 | Hekstra et al. | |
| 2009/0141980 A1 | 6/2009 | Elliott | |
| 2010/0039353 A1 | 2/2010 | Cernasov | |
| 2012/0293607 A1 | 11/2012 | Bhogal et al. | |
| 2014/0015941 A1* | 1/2014 | Park | H04N 13/0438 |
| | | | 348/56 |
| 2014/0368520 A1 | 12/2014 | Wen | |
| 2014/0375679 A1 | 12/2014 | Margolis et al. | |
| 2016/0267712 A1* | 9/2016 | Nartker | G06F 3/012 |

* cited by examiner

DISPLAY CONTROLLER, ELECTRONIC DEVICE, AND VIRTUAL REALITY DEVICE

CROSS-REFERENCE TO RELATED APPLICATIONS

This application claims priority from Korean Patent Application No. 10-2016-0065657, filed on May 27, 2016 and Korean Patent Application No. 10-2016-0079305, filed on Jun. 24, 2016 in the Korean Intellectual Property Office, the disclosure of which are incorporated herein by reference in their entireties.

BACKGROUND

1. Field

Methods and apparatuses consistent with example embodiments relate to a display controller, an electronic device, and a virtual reality device.

2. Description of Related Art

Since virtual reality devices have come into widespread use, a technology of providing a more realistic virtual reality service to the user has been researched. Virtual reality devices may include head-mounted display devices, or the like, that may be worn on a user's head. Virtual reality devices have basic display functions and output images. Unlike conventional display devices, virtual reality devices display images close to a user's eyes. Therefore, a technology that minimizes adverse effects, such as fatigue or vertigo, has been demanded.

SUMMARY

One or more example embodiments provide a display controller, an electronic device, and a virtual reality device, able to reduce the fatigue or vertigo of a user.

According to an aspect of an example embodiment, there is provided a display controller including: a frame rate converter configured to create a second reference image having a second frame rate higher than a first frame rate of a first reference image, based on the first reference image; a buffer configured to store the second reference image; and an image processor configured to create an output image by selecting at least a portion of the second reference image.

According to an aspect of another example embodiment, there is provided an electronic device including: an application processor; a sensor configured to generate movement information by detecting user movements; a display controller including a buffer configured to store a reference image, the display controller being configured to generate the reference image by increasing a frame rate of an original image, and create an output image by selecting at least a portion of the reference image, based on the movement information; and a display device including a display panel and a display driver configured to display the output image using the display panel.

According to an aspect of yet another example embodiment, there is provided a virtual reality device including: a frame configured to be worn on a user's head; a sensor configured to generate movement information by detecting user movements; a display controller including a buffer configured to store a reference image, the display controller being configured to generate the reference image by increasing a frame rate of an original image, and create an output image by selecting at least a portion of the reference image, based on the movement information; and a display device mounted on the frame, and being configured to display the output image.

According to an aspect of still another example embodiment, there is provided a method of generating an output image, the method including: receiving a first reference image including a first image frame and a second image frame, the first reference image having a first frame rate; generating a second reference image based on the first reference image, the second reference image having a second frame rate higher than the first frame rate; sensing user movement; and generating the output image based on the second reference image and the sensed user movement.

According to an aspect of another example embodiment, there is provided a display controller including: a frame rate converter configured to receive a first reference image having a first frame rate and generate a second reference image having a second frame rate; and an image processor configured to receive a sensor signal, receive the second reference image, determine an output portion of the second reference image based on the sensor signal, and generate an output image based on the output portion.

BRIEF DESCRIPTION OF DRAWINGS

The above, and other aspects, features, and advantages will be more clearly understood from the following detailed description when taken in conjunction with the accompanying drawings, in which.

DETAILED DESCRIPTION

Hereinafter, example embodiments will be described in detail with reference to the attached drawings.

Figure 1:
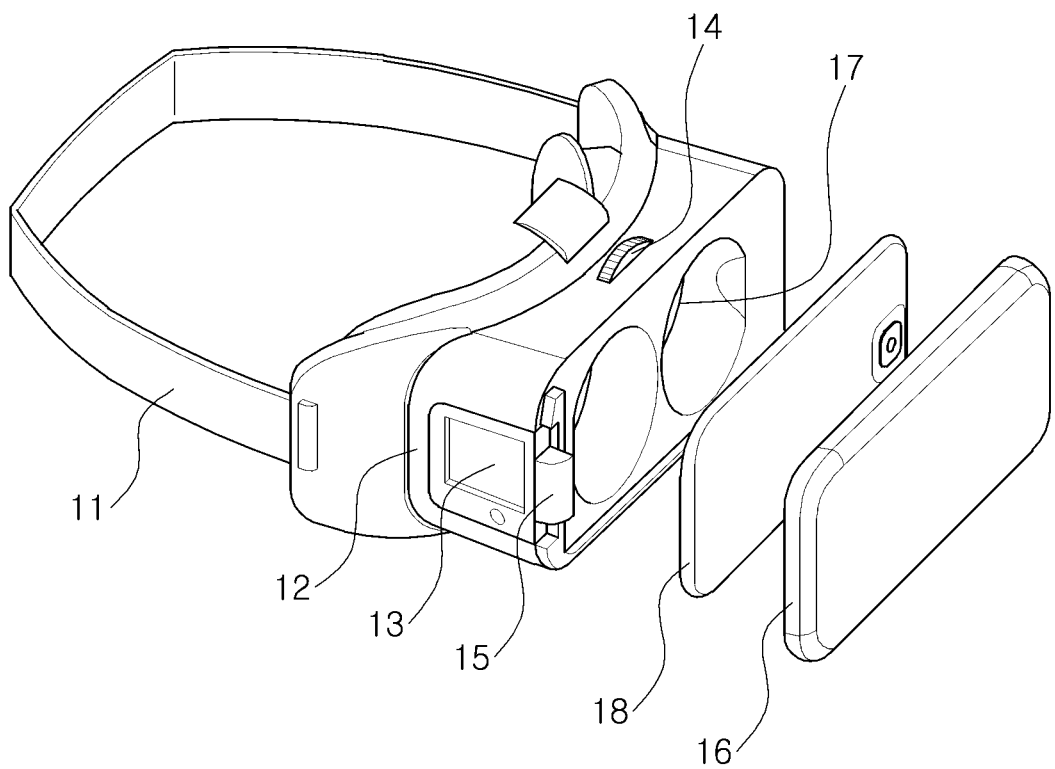
FIGS. 1 and 2 are views of virtual reality devices according to one or more example embodiments.
Figure 2:
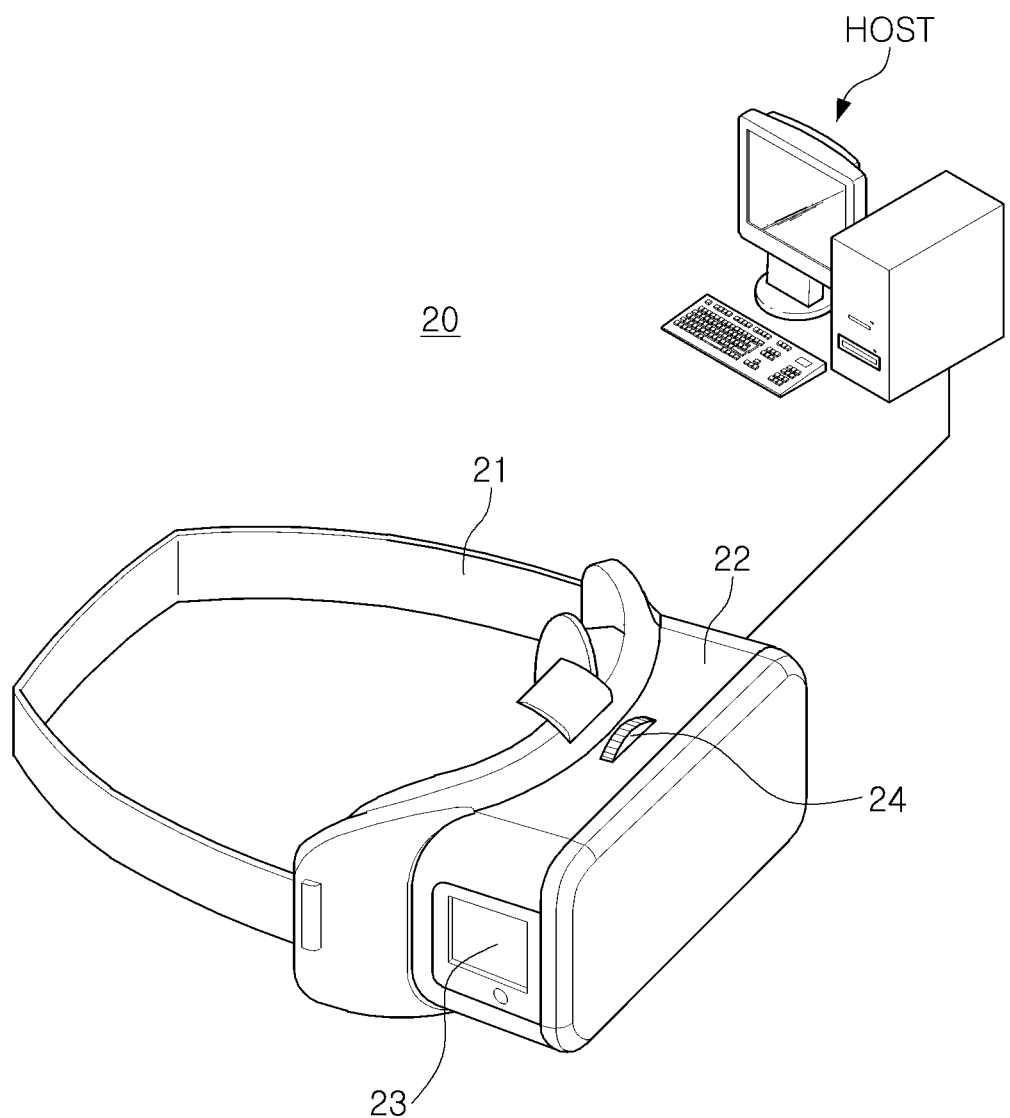

FIGS. 1 and 2 are views of virtual reality devices according to one or more example embodiments.

Referring to FIG. 1, a virtual reality device 10, according to an example embodiment, may be a head-mounted display (HMD), which a user may wear on his or her head. The virtual reality device 10 may have an electronic device 18 mounted therein to display an image to a user. The electronic device 18 may be mounted in an accommodation space of the virtual reality device 10. When the electronic device 18 is a device that may be attached to or detached from the virtual reality device 10, a smart device, such as a smartphone or the like, may be employed as the electronic device 18.

The virtual reality device 10 may include a fixing part 11, a frame 12, manipulation members 13 and 14, a connector 15, a cover 16, and an optical part 17. The fixing part 11 may be provided to mount the virtual reality device 10 on a user's head, and may include a fixing member, such as a band, for example, a strap, formed of an elastic member, a temple, or a helmet. The user may use the virtual reality device 10 by placing his or her head within the fixing part 11, and a portion of the frame 12 may thus be in close contact with a peripheral region of the user' eyes. In order to reduce user's fatigue, the frame 12 may include an elastic material in the portion of the frame 12 that may be in close contact with the peripheral region of the user's eyes.

The frame 12 may include a space for accommodating the electronic device 18. The electronic device 18 may be a separate device that may be attached to or detached from the frame 12, as described above. The frame 12 may include the optical part 17 disposed between the electronic device 18 and the user's eyes, and the optical part 17 may include a lens. The electronic device 18 may be disposed on a front of the optical part 17, and the cover 16 may be disposed on a rear of the electronic device 18.

The connector 15 may be electrically connected to the electronic device 18 to transmit a control signal to and receive a control signal from the electronic device 18. In particular, when the electronic device 18 is a device that may be attached to or detached from the frame 12, the connector 15 may be connected to a connector of the electronic device 18. In an example embodiment, when the electronic device 18 is a smart device, the connector 15 may connect to a connector included in the smart device that complies with various standards, such as a universal serial bus (USB), a micro-USB, or a lighting terminal.

The manipulation members 13 and 14 may include a touch panel or/and a mechanical wheel. The user may perform functions, such as image playback, pausing, image viewpoint shifting, or volume adjustment, through the manipulation members 13 and 14. Manipulation member 13 may be a touch panel and manipulation member 14 may be a wheel. The wheel 14 may be provided to input a function different from that of the touch panel 13, for example, to adjust the focus of the optical part 17. The virtual reality device 10 may further include various other manipulation devices, in addition to the touch panel 13 and the wheel 14.

Referring to FIG. 2, a virtual reality device 20 according to an example embodiment may be a stand-alone device capable of providing a virtual reality service to the user without being combined with a separate electronic device 18. In the example embodiment illustrated in FIG. 2, the virtual reality device 20 may include a fixing part 21, a frame 22, and manipulation members 23 and 24, similar to the example embodiment illustrated in FIG. 1. In the example embodiment illustrated in FIG. 2, a separate electronic device is not accommodated in the virtual reality device 20, and a configuration, such as a connector or a cover, may be removed. A display device that generates an image and an optical part may be provided in an internal space of the frame 22, which the user's gaze may reach.

Meanwhile, the virtual reality device 20 provided as the stand-alone device, according to an example embodiment, may be connected to an external host, such as a desktop personal computer (PC) or a laptop PC, to receive power or/and data for virtual reality from the external host. As illustrated in FIG. 2, the virtual reality device 20 may be connected to a host by wires. In a different manner, the virtual reality device 20 may be wirelessly connected to the host.

An image viewed by the user through virtual reality device 10 or 20 may be a still image or a video. While a virtual reality service is being provided, an image viewed by the user may change, depending on movements of a user wearing the virtual reality device 10 or 20. Thus, in order to display an image naturally, despite a sudden movement of the user, a method of retrieving an area of the image that the user desires to view from an original image with a short latency time may be demanded.

Dozens of still images may be consecutively displayed per second, and the user may thus recognize the consecutively displayed still images as a video. For example, the image viewed by the user may be changed dozens of times per second. An image viewed by the user through the virtual reality device 10 or 20 may be located very close to the user's eyes, and when a frame rate or frames per second (FPS) indicating the number of still images displayed per second is low, the user can recognize image interruption. Further, in a video, a method of retrieving an area that needs to be actually displayed from an original image with a short latency time when the user moves is needed.

In the case of a video, an frame rate may be increased by force. However, in this case, a processor may need to handle a large amount of computation, resulting in an increase in power consumption of the processor or an increase in the manufacturing costs of a processor. In particular, because the virtual reality device 10 or 20 may be generally provided in a mobile environment, an increase in power consumption of a processor may lead to a reduction in use time of the virtual reality device 10 or 20, thus causing user inconvenience.

According to an example embodiment, a display controller may create a reference image by selecting a certain area from an original image, may increase a frame rate of the reference image, and may store the reference image in a buffer. The reference image may include an output image viewed by the user who wears the virtual reality device 10 or 20. For example, the reference image may have the same size as or be larger than the output image. When the user moves, the display controller may select and output a portion of the reference image stored in the buffer. Thus, a smooth moving picture may be provided with a high frame rate, and the output image may be changed with a short latency time. As a result, an image may be smoothly scrolled and displayed even when the user moves. Hence, a more realistic virtual reality service may be provided to the user.

Figure 3:
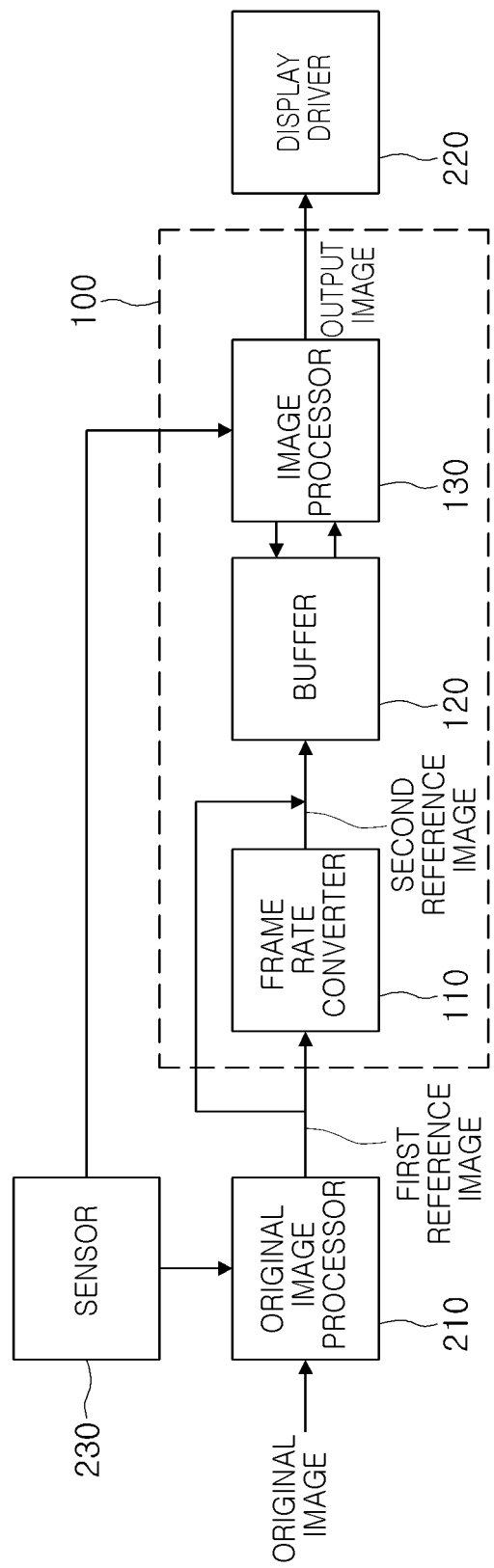
FIGS. 3 and 4 are diagrams of display controllers according to one or more example embodiments.
Figure 4:
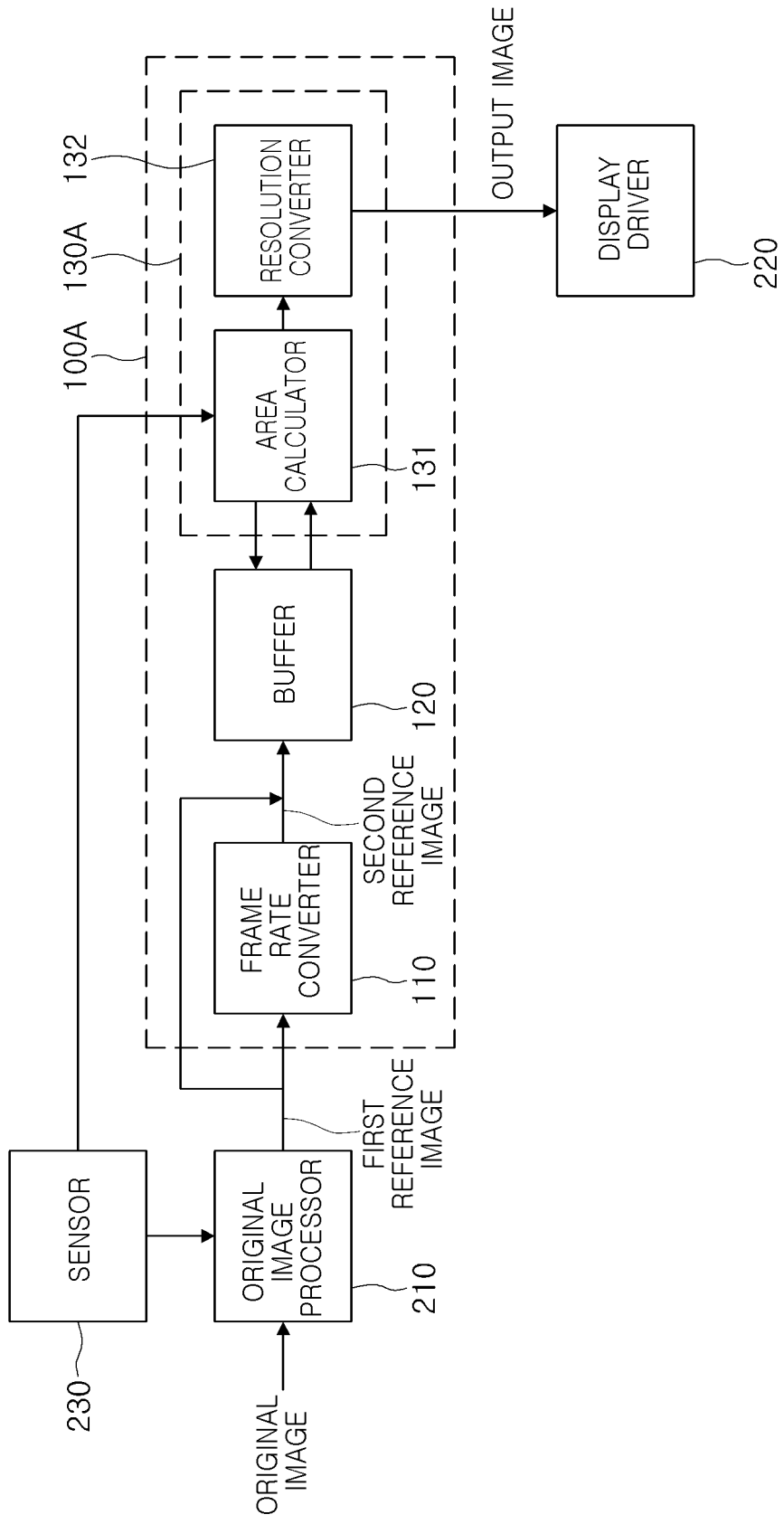

FIGS. 3 and 4 are diagrams of display controllers according to one or more example embodiments.

Referring first to FIG. 3, a display controller 100 according to an example embodiment may include a frame rate converter (FRC) 110, a buffer 120, and an image processor 130. The display controller 100 may receive a reference image from an original image processor 210, and may generate an output image based on the received reference image. The output image may be transmitted to a display driver (DDI) 220. The DDI 220 may include a timing controller, a gate driver, and a source driver. According to an example embodiment, an input image may also be directly transmitted to the buffer 120 by bypassing the FRC 110.

When the virtual reality device 10 provides a virtual reality service with the electronic device 18 that may be attached to or detached from the virtual reality device 10, at least portions of the original image processor 210, the DDI 220, and the display controller 100 may be included in the electronic device 18. As an example, at least one of the original image processor 210 and the display controller 100 may be provided as a single module with an execution processor controlling the electronic device 18, for example, an application processor. Meanwhile, the stand-alone virtual reality device 20 may have the display controller 100, the original image processor 210, and the DDI 220 provided therein. In this case, the display controller 100, and at least portions of the original image processor 210 and the DDI 220 may be implemented as a single module.

The original image processor 210 may receive an original image from an external source, and may create a first reference image from the received original image. The original image processor 210 may receive an original image from an external imaging device or the like, or may retrieve image data, stored in a memory or the like, as an original image. The original image processor 210 may be implemented as a single module with the application processor of the electronic device 18, or the main processor of the stand-alone virtual reality device 20. In an example embodiment, when the original image processor 210 receives an original image having a video format, the original image may be a video having a frame rate less than or equal to 30 FPS.

The virtual reality device 10 or 20 may display an output image at a distance very close to the user's eyes. Thus, unlike in a smart device, a television, and a projector provided for the purpose of remote watching, the user may easily feel fatigue according to quality of the output image. In a case in which the original image has a low frame rate, when the virtual reality device 10 or 20 outputs the original image as is, a degree of user fatigue may be increased. In a general case, a method of reducing user fatigue by increasing the frame rate of the original image and outputting the original image by the original image processor 210 included in a main processor or an application processor, may be employed.

When the original image processor 210 increases the frame rate of the original image, power consumed by the main processor or the application processor may be increased, and use time of the virtual reality device 10 or 20 may thus be reduced, because the virtual reality device 10 or 20 can be mostly used in a handheld environment. Further, when the resolution of the original image is high, an amount of computation that needs to be processed by the original image processor 210 may be increased, and the performance requirements of the original image processor 210 may be more demanding, thus resulting in a problem, such as an increase in manufacturing costs of the main processor or the application processor.

According to various example embodiments, display controller 100 may adjust a frame rate of the first reference image output by the original image processor 210 while solving the problem of judder or the like that may occur in a virtual reality service by using various image processing methods.

Meanwhile, the virtual reality device 10 or 20 may detect user movements to control an image viewed by the user. In an example embodiment, when the user who wears the virtual reality device 10 or 20 moves the head or eyes of the user in various directions, such as up, down, right, or left, a sensor 230 may detect user movements to generate movement information. The virtual reality device 10 or 20 may change an image viewed by the user, based on the generated movement information. When image scrolling according to user movements is not smoothly performed, the user may recognize image interruption to easily feel vertigo or fatigue.

According to various example embodiments, the display controller 100 may store a reference image including a larger area than an image viewed by the user in the buffer 120. When user movements are detected, the image processor 130 may select and output an image that needs to be displayed according to user movements from the reference image stored in the buffer 120. Thus, a latency time needed to change an image according to user movements may be reduced so as to provide smooth image scrolling, and a more convenient and realistic virtual reality service to the user.

Referring next to FIG. 4, in a display controller 100A according to an example embodiment, an image processor 130A may include an area calculator 131 and a resolution converter 132, and may further include an image distorter. The area calculator 131 may select at least a portion of a second reference image stored in a buffer 120, and may operate similarly to the image processor 130 according to the example embodiment illustrated in FIG. 3. The resolution converter 132 or the image distorter may distort the features of an image output by the area calculator 131, for example, the resolution of the image, to generate a distorted image or a reverse image through the optical part 17. Further, the resolution converter 132 or the image distorter may increase the resolution of an image output by the area calculator 131.

When the resolution of an original image transmitted to the original image processor 210 is high, an amount of computation an FRC 110 needs to increase a frame rate of a first reference image may be increased. Further, because the volume of the second reference image output by the FRC 110 is large, the required capacity of the buffer 120 may also be increased. In an example embodiment, in order to reduce the burden of the FRC 110 on computation and the capacity of the buffer 120, the original image processor 210 may generate the first reference image by decreasing the resolution of the original image.

Because an image output by the virtual reality device 10 or 20 may be displayed at a location very close to the user's eyes, when the resolution of the output image is low, break of pixel data, boundary between adjacent pixels, or the like may be recognized by the user. Thus, the first reference image may be generated by reducing the resolution of the original image, and the resolution converter 132 may be disposed at an output terminal of the area calculator 131 so as to transmit, to a DDI 220, an output image having a resolution similar to or higher than that of the original image. The resolution of the first reference image may be lowered, and the capacity of the buffer 120 and the burden of the FRC 110 on computation may thus be reduced. The output image may be repeatedly increased in resolution, and transmitted to the DDI 220 so as to provide an output image having high resolution to the user.

Figure 5:
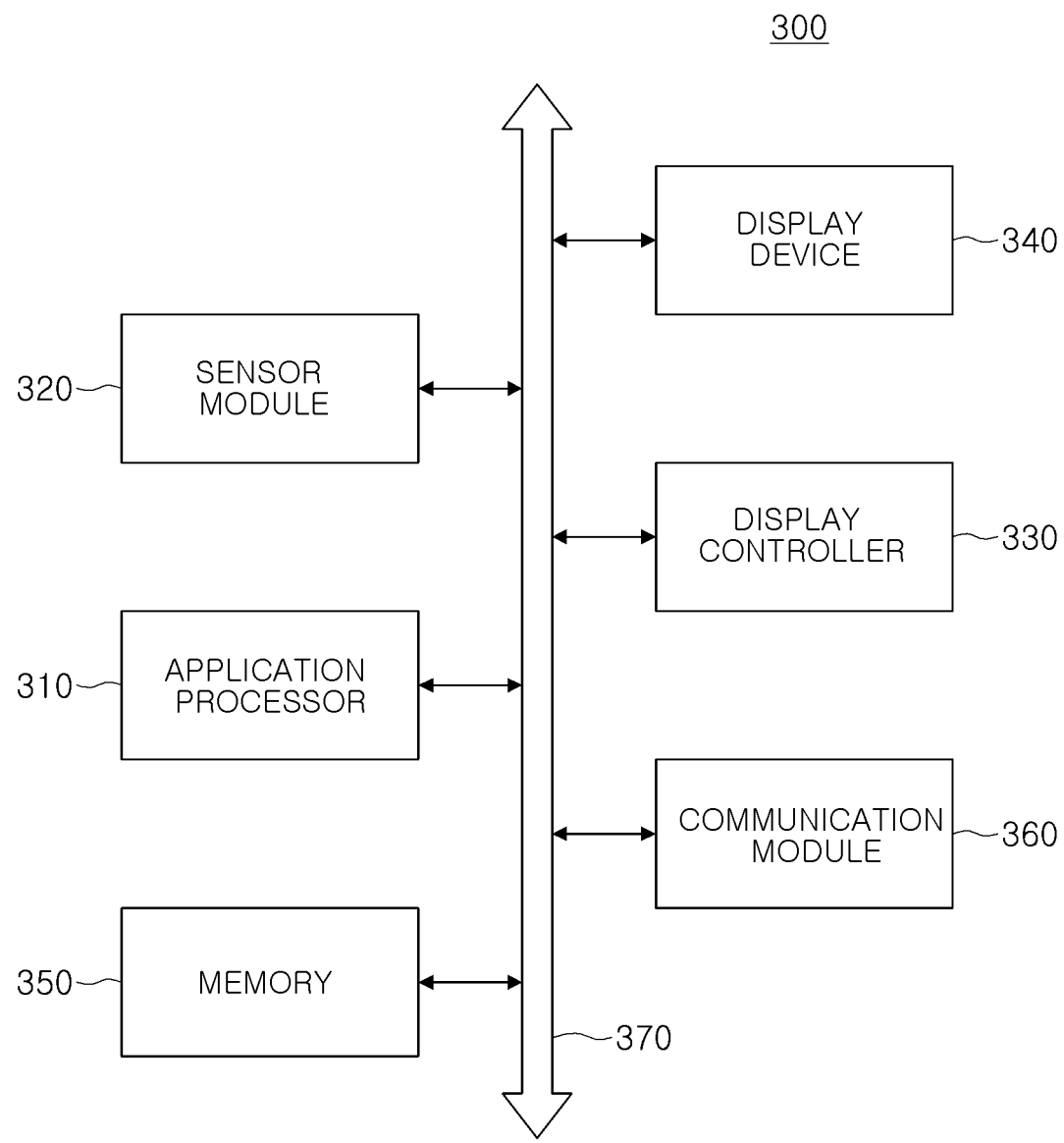
FIG. 5 is a block diagram of an electronic device according to an example embodiment.

FIG. 5 is a block diagram of an electronic device according to an example embodiment.

Referring to FIG. 5, an electronic device 300 according to an example embodiment may include an application processor 310, a sensor module 320, a display controller 330, a display device 340, a memory 350, and a communication module 360. The respective components included in the electronic device 300 may exchange data with each other through a data bus 370.

The application processor 310 may be an execution processor for controlling the overall operations of the electronic device 300. When the electronic device 300 is mounted on the virtual reality device 10 to be used to provide a virtual reality service, the application processor 310 may receive an original image from an external imaging device through the communication module 360, or may retrieve image data stored in the memory 350 to use the retrieved image data as an original image. In an example embodiment, the application processor 310 may include the original image processor 210 described with reference to FIGS. 3 and 4.

The sensor module 320 may have at least one sensor, and in particular, may include a motion sensor detecting user movements. When the electronic device 300 is mounted on the virtual reality device 10 and the virtual reality device 10 is worn by a user, movement of the user's head or eyes may be detected by the sensor module 320. Based on user movements detected by the sensor module 320, an image for the virtual reality service displayed to the user may be changed.

In an example embodiment, the display controller 330 may include a FRC, a buffer, and an image processor. The display controller 330 may increase a frame rate of the original image for providing the virtual reality service to the user, and may store the original image in the buffer. Further, the display controller 330 may generate an output image by selecting at least a portion of the image stored in the buffer, based on user movements detected by the sensor module 320.

The output image generated by the display controller 330 may be displayed to the user through the display device 340. The display device 340 may include a display panel and a DDI. The DDI may include a timing controller, a gate driver, and a data driver. In an example embodiment, the display controller 330 may be implemented as a single module with the DDI or the application processor 310.

Figure 6:
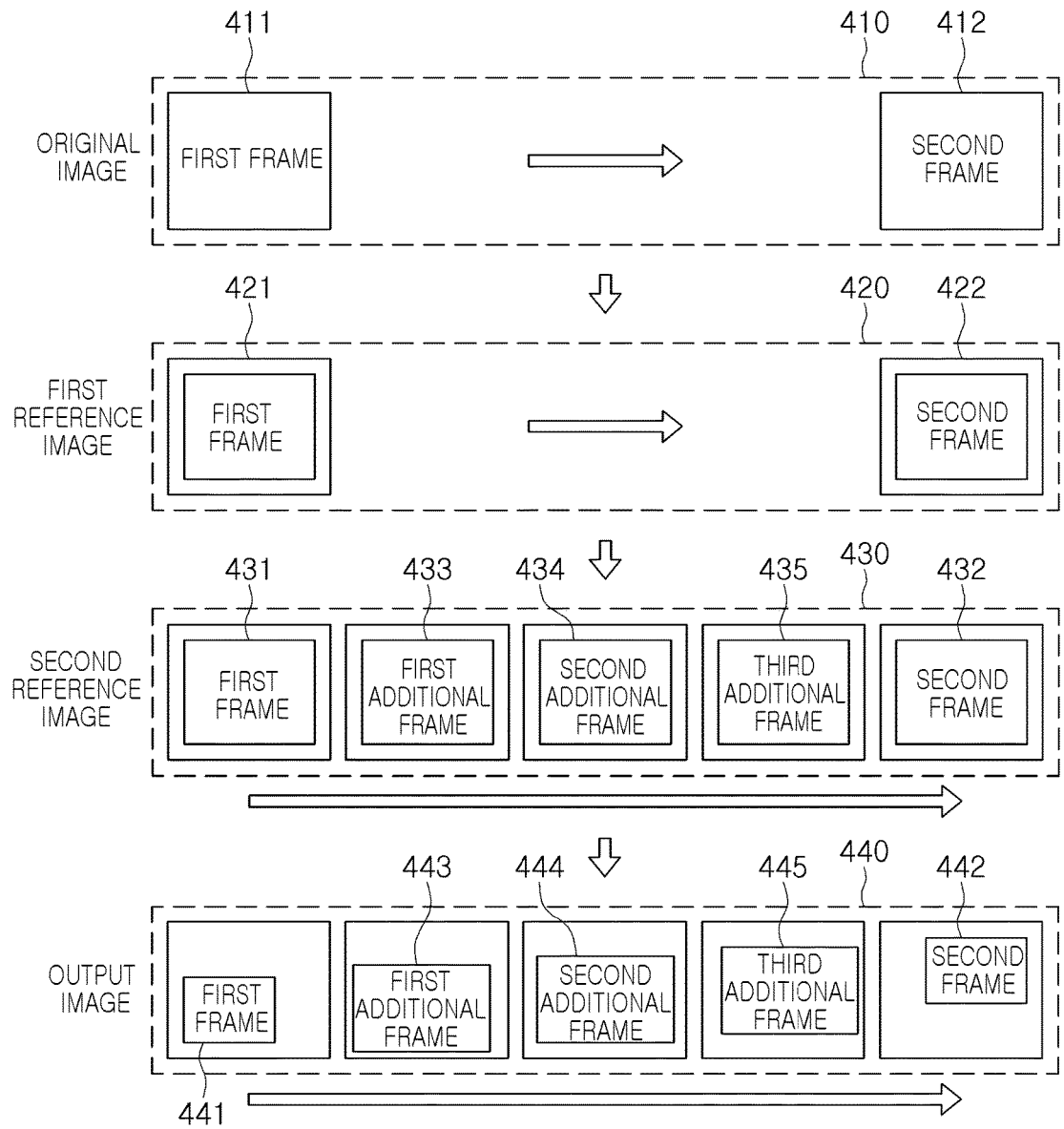
FIGS. 6 and 7 are diagrams illustrating operations of a display controller according to one or more example embodiments.
Figure 7:
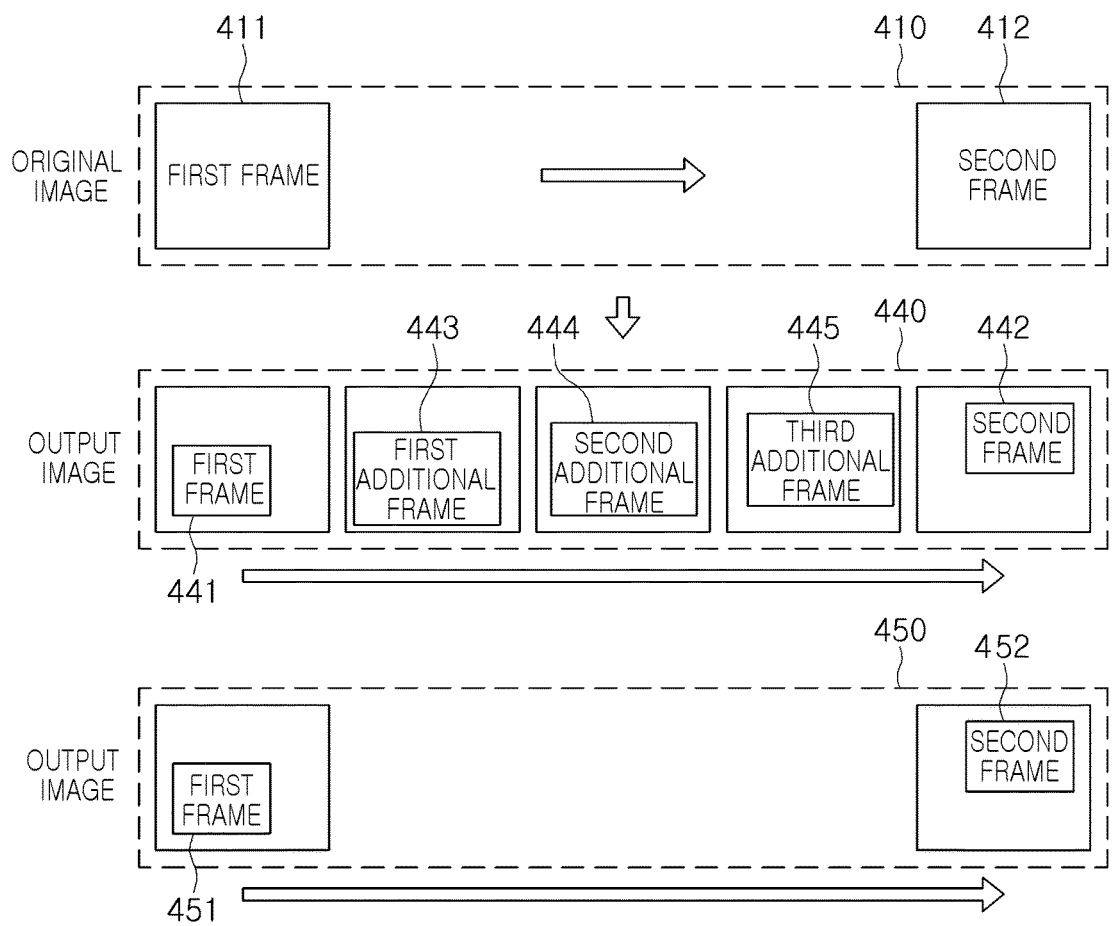

FIGS. 6 and 7 are diagrams illustrating operations of a display controller according to one or more example embodiments. Operations of a display controller, according to an example embodiment, will hereinafter be described with reference to FIG. 3 for convenience of description.

Referring first to FIG. 6, an original image 410 may be a video having a first frame rate. Assuming that the first frame rate is 24 FPS, for example, ¹⁄₂₄ of a second, or about 41.7 msec, may exist between a first image frame 411 and a second image frame 412 consecutively displayed in the original image 410. Because a time for an image, viewed by the human eye, to be transmitted from the optic nerve to the brain and then recognized by the human is very short, when the original image 410 having 24 FPS is output as is, the user may recognize image interruption. In the case of the original image 410 having 30 FPS, in which a time of about 33.3 msec exists between the first and second image frames 411 and 412, the user may also recognize image interruption.

In an example embodiment, the display controller 100 may increase a frame rate of the original image 410 to generate an output image. Referring to FIGS. 3 and 6, the original image processor 210 may process the original image 410 to generate a first reference image 420. First and second image frames 421 and 422 included in the first reference image 420 may be portions selected from the first and second image frames 411 and 412 included in the original image 410. The first reference image 420 may have the same frame rate as that of the original image 410.

The first reference image 420 may be transmitted to the display controller 100. The FRC 110 may receive the first reference image 420 to generate a second reference image 430. The second reference image 430 may include a first image frame 431, a second image frame 432, and first to third additional image frames 433 to 435 inserted therebetween. The first and second image frames 431 and 432 may be the same as the first and second image frames 421 and 422 included in the first reference image 420, respectively.

The first to third additional image frames 433 to 435 may be inserted by the FRC 110. In an example embodiment, the first to third additional image frames 433 to 435 may be the same as the first image frame 431 or the second image frame 432. When the original image 410 has a frame rate of 30 FPS, the second reference image 430 may have a frame rate of 120 FPS, generated by inserting the first to third additional image frames 433 to 435. The second reference image 430 may be stored in the buffer 120.

The image processor 130 may select at least portions of the first to third additional image frames 433 to 435 included in the second reference image 430 stored in the buffer 120 to generate an output image 440. Referring to FIG. 6, the output image 440 may have the same frame rate as that of the second reference image 430. A first image frame 441, a second image frame 442, and first to third additional image frames 443 to 445 included in the output image 440 may have a smaller size than the first image frame 431, the second image frame 432, and the first to third additional image frames 433 to 435 included in the second reference image 430, respectively.

The first image frame 441, the second image frame 442, and the first to third additional image frames 443 to 445 included in the output image 440 may be images that may be viewed by the eyes of the user who wears the virtual reality device 10 or 20. The first image frame 441, the second image frame 442, and the first to third additional image frames 443 to 445 included in the output image 440 may represent portions selected from the first image frame 431, the second image frame 432, and the first to third additional image frames 433 to 435 included in the second reference image 430, respectively. In an example embodiment, the first image frame 441, the second image frame 442, and the first to third additional image frames 443 to 445 included in the output image 440 may be generated by detecting the movement of the eyes or head of the user and selecting portions from the first image frame 431, the second image frame 432, and the first to third additional image frames 433 to 435 included in the second reference image 430.

Referring to FIG. 7, a common output image 450 received without the display controller 100 according to an example embodiment increasing the frame rate, may allow a second image frame 452 to be displayed immediately after a first image frame 451. A time of about ¹⁄₃₀ second may exist between the first and second image frames 451 and 452, and a displacement difference between the first and second image frames 451 and 452 may thus be recognized by the user. Thus, when the user views the common output image 450 through the virtual reality device 10 or 20, the user may recognize image interruption or an instant movement of a certain portion of an image to feel fatigue or vertigo.

Referring to FIG. 7, unlike in the common output image 450, an output image 440 generated by the display controller 100 according to an example embodiment may include first to third additional image frames 443 to 445 inserted between first and second image frames 441 and 442. Thus, a frame rate of the output image 440 may be increased to 120 FPS, and the user may not be allowed to recognize image interruption, thus preventing fatigue or vertigo.

Further, the first to third additional image frames 443 to 445 may be generated based on the movement of the eyes or head of the user. The first to third additional image frames 443 to 445 included in the output image 440 may be defined as portions of the output image 440 corresponding to the movement of the eyes or head of the user for a time interval between the first and second image frames 441 and 442. For example, the first to third additional image frames 443 to 445 may be portions of the output image 440 between the first and second image frames 441 and 442. Thus, the virtual reality device 10 or 20 may display the first image frame 441, the first additional image frame 443, the second additional image frame 444, the third additional image frames 445, and the second image frame 442 consecutively, to thus provide the user with the output image 440 that may be seamlessly and naturally scrolled.

As described above, the second reference image 430 may be stored in the buffer 120, and the image processor 130 may generate the first to third additional image frames 433 to 435 by only selecting portions from the second reference image 430 stored in the buffer 120 in consideration of the movement of the eyes or head of the user. Thus, a latency time needed to generate the first to third additional image frames 443 to 445 may be reduced, and a response rate of the virtual reality device 10 or 20 according to user movements may be increased.

Figure 8:
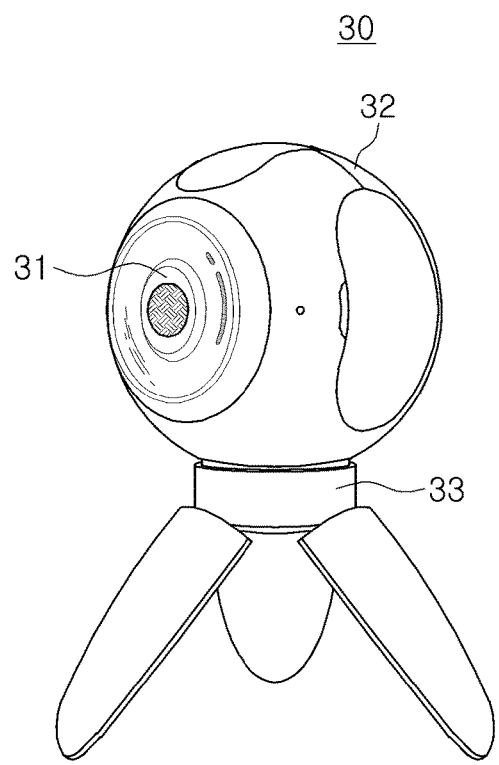
FIG. 8 is a view of an imaging device capable of working with a virtual reality device according to an example embodiment.

FIG. 8 is a view of an imaging device capable of working with a virtual reality device according to an example embodiment.

Referring to FIG. 8, an imaging device 30 according to an example embodiment may include a camera 31, a case 32, and a support part 33. The camera 31 may include at least one lens and image sensor, and an image processor that generates an image from a signal generated by the image sensor. In an example embodiment, the imaging device 30 may capture a 360 degree surrounding image, based on the imaging device 30. In this case, the at least one lens included in the camera 31 may be a fisheye lens that may allow a wide angle image to be captured at once. In order to capture a 360 degree surrounding image at once, the camera 31 may include a plurality of fisheye lenses disposed on different positions of the camera 31, and the at least one image sensor may be provided as a plurality of image sensors.

An image generated by the imaging device 30 may be transmitted to the virtual reality device 10 or 20 as an original image. The virtual reality device 10 or 20 and the imaging device 30 may be connected to each other by a wired or wireless communication protocol, and the user may wear the virtual reality device 10 or 20 to view the original image transmitted by the imaging device 30 in real time. In the case of the virtual reality device 10 other than a stand-alone virtual reality device, the electronic device 18 may provide a virtual reality service to the user by outputting the original image transmitted by the imaging device 30.

FIGS. 9 through 16 are diagrams illustrating operations of a display controller according to various example embodiments. Below, operations of the display controller according to various example embodiments, when an original image is a 360 degree image, will be described with reference to FIGS. 9 through 11.

Figure 9:
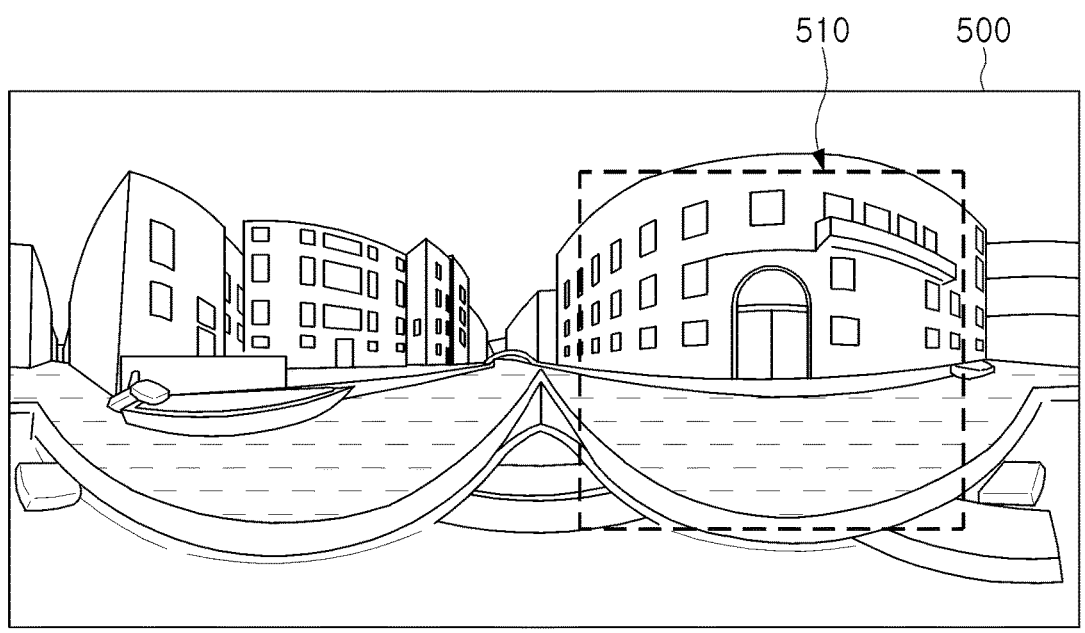
FIGS. 9 through 17 are diagrams illustrating operations of a display controller according to one or more example embodiments.

Referring to FIG. 9, an original image 500 may be obtained by capturing a 360 degree periphery of the imaging device 30, based on the imaging device 30 according to the example embodiment illustrated in FIG. 8. The original image processor 210 may generate a first reference image 510 by selecting and cutting a portion from the original image 500 in consideration of user movements or the shifting of the eyes of the user detected by the sensor 230. The first reference image 510 may have the same frame rate as that of the original image 500. As illustrated in FIG. 9, the first reference image 510 may be a portion selected from the original image 500, and may be larger than an output image actually displayed to the user.

As described above with reference to FIG. 3, the display controller 100 may include the FRC 110, the buffer 120, and the image processor 130. The FRC 110 may increase a frame rate of the first reference image 510 generated by the original image processor 210. The first reference image 510 may have the same frame rate as that of the original image 500, and in an example embodiment, when the frame rate of the first reference image 510 is 30 FPS, the FRC 110 may increase the frame rate of the first reference image 510 to 120 FPS to generate a second reference image 520, and may store the second reference image 520 in the buffer 120. The second reference image 520 may have the same size or/and resolution as the first reference image 510.

Figure 10:
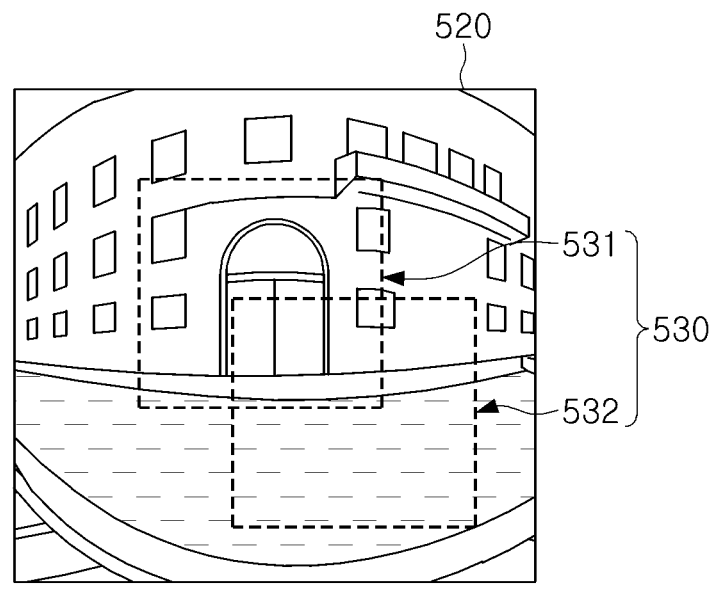
Figure 10:
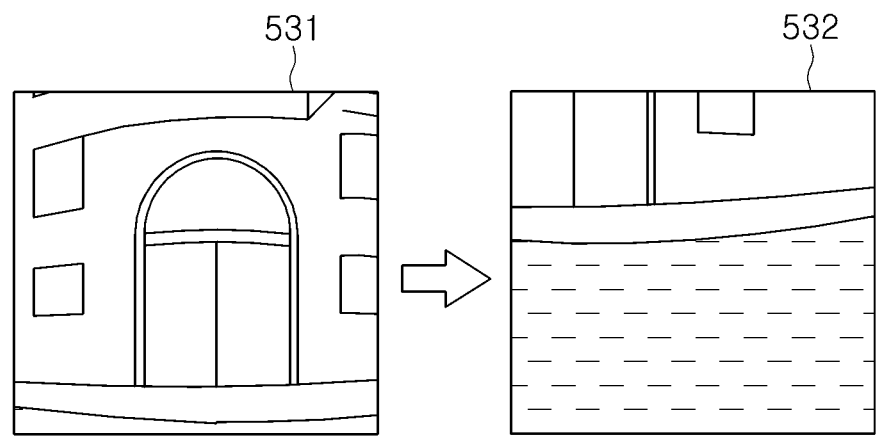

When the display controller 100 according to an example embodiment is not employed, an output image 530 may allow first and second image frames 531 and 532 to be consecutively displayed, as illustrated in FIG. 10. The output image 530 may have the same frame rate as those of the original image 500 and the first reference image 510, and a time of 1/30 second may exist between the first and second image frames 531 and 532. Thus, as the second image frame 532 is displayed after the first image frame 531 according to the movement of the eyes or head of the user, the user may recognize buffering of the output image 530 and slow image transition. This may cause the user's fatigue or vertigo.

Figure 11:
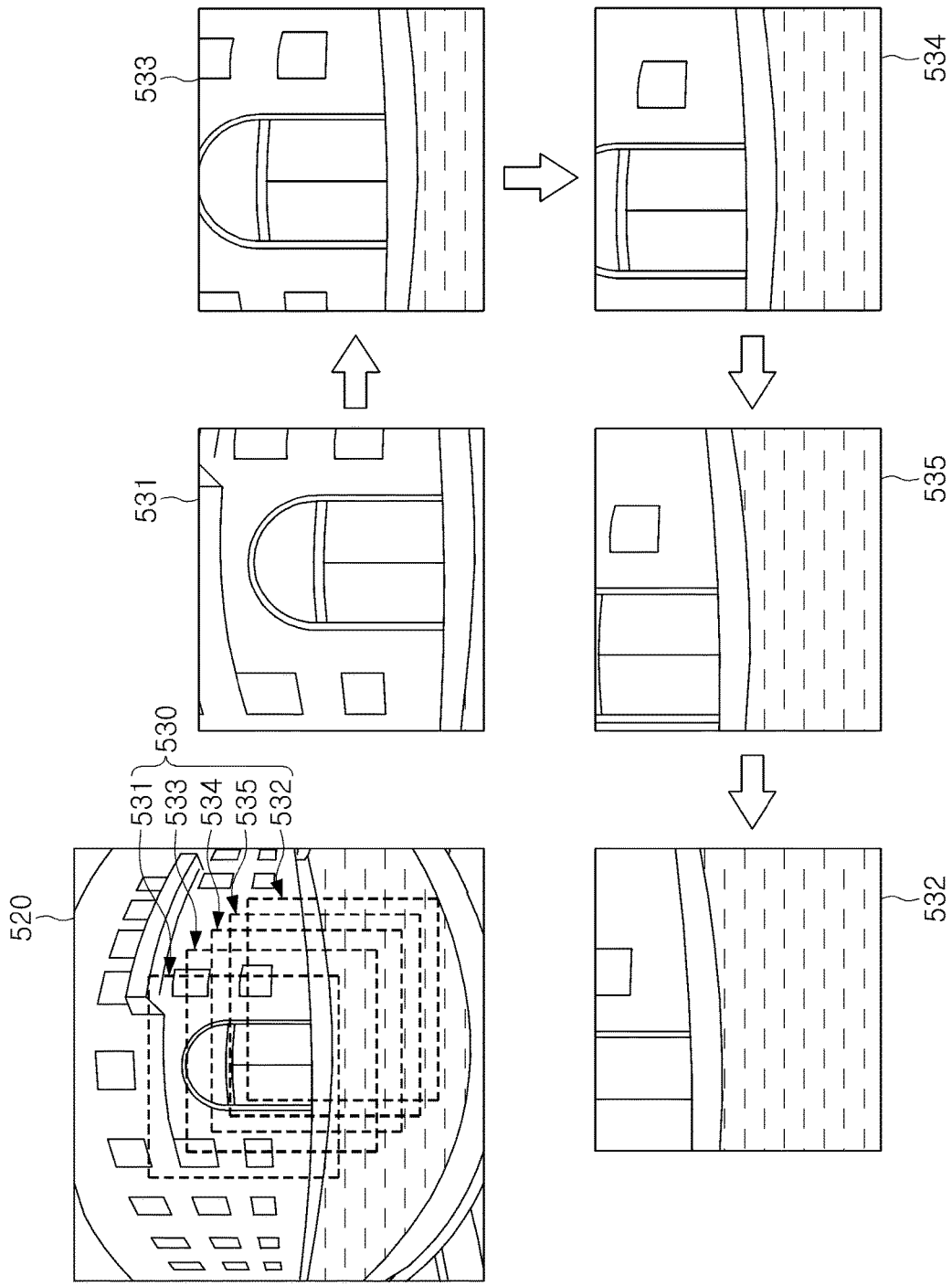

Referring to FIG. 11, the image processor 130 included in the display controller 100 according to an example embodiment may generate the output image 530, actually displayed to the user, from the second reference image 520 stored in the buffer 120. The output image 530 may include a plurality of additional image frames 533 to 535 inserted between the first and second image frames 531 and 532 and sequentially displayed, unlike in FIG. 10. Thus, three additional image frames 533 to 535 may further be displayed to the user during 1/30 second, as illustrated in FIG. 11, to prevent the user from recognizing buffering of the output image 530 or slow image transition, and to reduce the fatigue and vertigo of the user.

In an example embodiment, the image processor 130 may generate the additional image frames 533 to 535 according to the movement of the head or eyes of the user detected by the sensor 230. For example, in an example embodiment, the image processor 130 may receive detection information from the sensor 230, and may generate the additional image frames 533 to 535 by only selecting portions of image frames included in the second reference image 520 stored in the buffer 120. Thus, a time needed to generate the additional image frames 533 to 535 necessary for increasing the frame rate of the output image 530 may be reduced to thus inhibit an occurrence of a judder phenomenon. The number of the additional image frames 533 to 535 may be appropriately changed in consideration of a frame rate of a targeted output image and the speed of user movements or the shifting of the eyes of the user.

Figure 12:
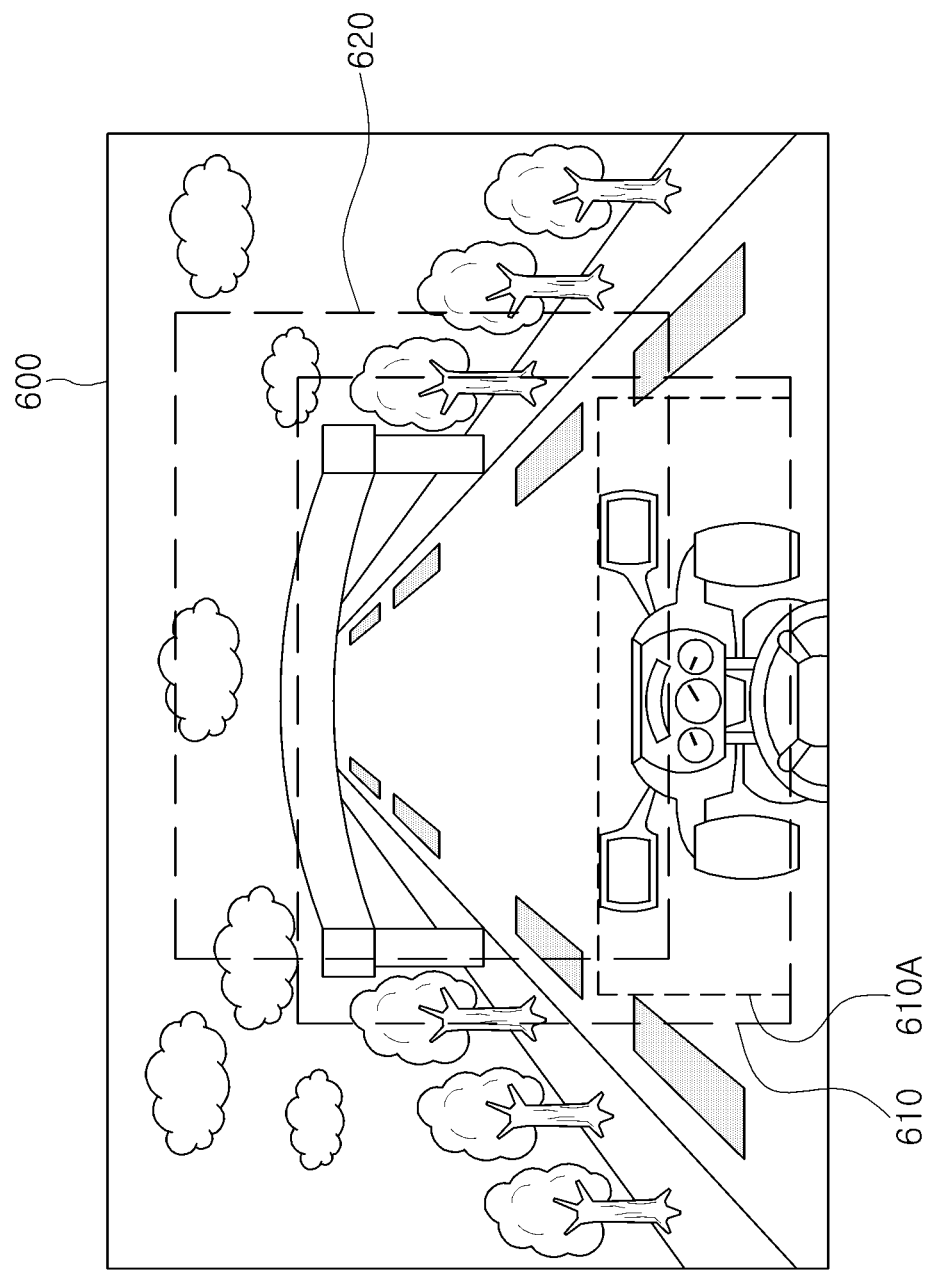
Figure 13:
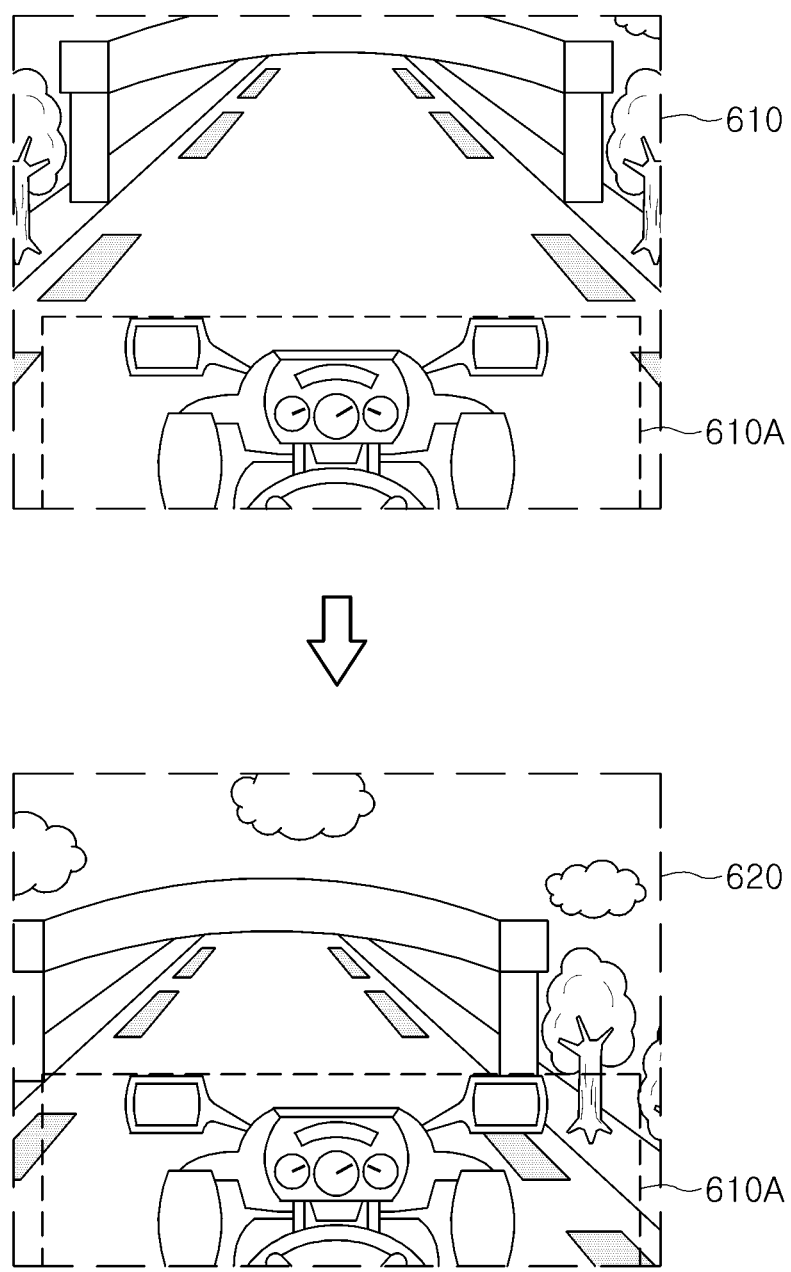
Figure 14:
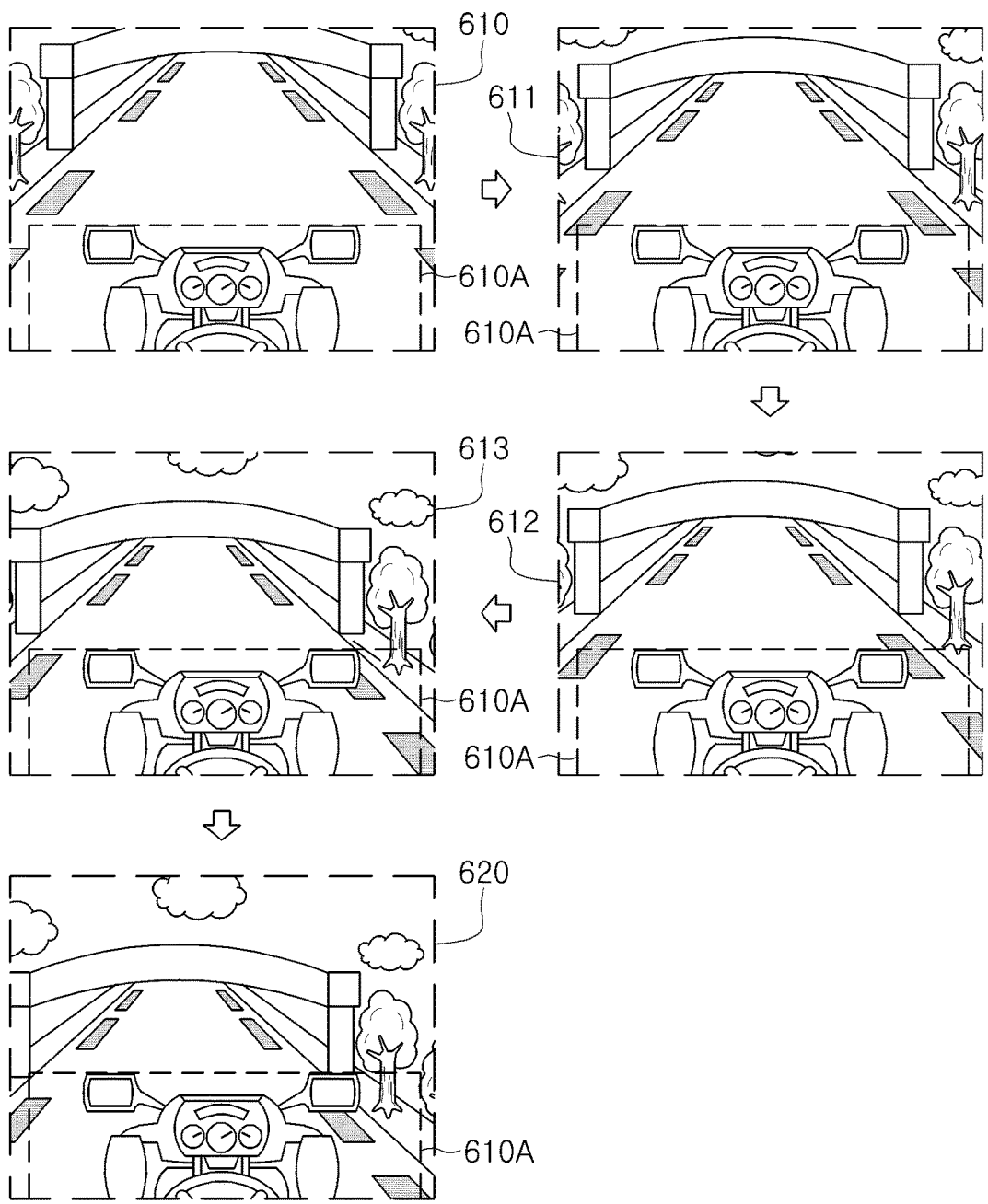

Referring next to FIGS. 12 through 14, when an original image is a game image, operations of a display controller according to an example embodiment will be described. For example, in the example embodiments illustrated in FIGS. 12 through 14, the virtual reality device 10 or 20 may provide a game function based on a virtual reality service to the user. FIGS. 12 through 14 illustrate a racing game as an example, but game functions for various genres different to that of the racing game may also be provided.

Referring first to FIG. 12, the FRC 110 of the display controller 100 may generate a second reference image 600 larger than image frames 610 and 620 included in an output image actually display to a game user, and may store the second reference image 600 in the buffer 120. The second reference image 600 may have substantially the same size as that of a first reference image transmitted by the original image processor 210, and may have a frame rate higher than that of an original image provided by a game program. The FRC 110 may increase a frame rate of the first reference image transmitted by the original image processor 210 to generate the second reference image 600, and may store the second reference image 600 in the buffer 120.

For example, while a game is run, the FRC 110 of the display controller 100 may store the second reference image 600 having a frame rate higher than that of the original image in the buffer 120. Meanwhile, the game user may play the game while actually viewing the image frames 610 and 620 included in the output image, which are portions of the second reference image 600.

A game based on a virtual reality service may be played from a first-person point of view of a game user who plays the game. In order to provide a natural game image at a quick response rate, portions of the image frames 610 and 620 included in the output image may be changed relatively less than other portions of the image frame while the game is played. In the case of the racing game, according to the example embodiments illustrated in FIGS. 12 through 14, a foreground image 610A illustrating a vehicle that is assumed to have a game user seated therein may only include changes in the movement of a steering wheel or wheels of the vehicle while the game user plays the racing game, or changes in images reflected by side-view mirrors of the vehicle.

Referring to FIG. 13, the first and second image frames 610 and 620 included in the output image may be sequentially displayed, and the first and second image frames 610 and 620 may be determined according to a driving direction of the vehicle in the racing game, as controlled by the game user. The second image frame 620 may be positioned on a right upper end of the first frame 610 with respect to the first image frame 610, and when the game user drives the vehicle forward to the right by controlling the steering wheel and an accelerator pedal, the second image frame 620 may be displayed subsequent the first image frame 610. In general, a game image may have a frame rate of 30 FPS, and a time interval between the first and second image frames 610 and 620 may be about ⅟30 second. Thus, the game user may sense a transition or a time interval between the first and second image frames 610 and 620, which may cause the vertigo or fatigue of the game user.

In an example embodiment, as illustrated in FIG. 14, a plurality of additional image frames 611 to 613 may be inserted between the first and second image frames 610 and 620. The additional image frames 611 to 613 may be portions selected from the second reference image 600. The image processor 130 of the display controller 100 may select portions of image frames included in the second reference image 600 stored in the buffer 120 to generate the additional image frames 611 to 613. In an example embodiment, the image processor 130 may generate the additional image frames 611 to 613 in consideration of a control command inputted by the game user, and a moving direction and a moving rate of the eyes or the head of the game user.

As described above, the second reference image 600 stored in the buffer 120 may have a frame rate higher than that of the original image provided by the game program. In an example embodiment, when the original image provided by the game program has a frame rate of 30 FPS, the second reference image 600 stored in the buffer 120 may have a frame rate of 120 FPS. For example, the image frames included in the second reference image 600 stored in the buffer 120 may be displayed every ⅟120 second.

In an example embodiment, the additional image frames 611 to 613 inserted between the first and second image frames 610 and 620 may be portions selected from the image frames included in the second reference image 600, and the output image may also have a frame rate of 120 FPS, as in the second reference image 600. Thus, the fatigue of the game user and a judder phenomenon may be reduced. Further, without processing by the original image processor 210, only selected portions of the second reference image 600 stored in the buffer 120 allow the additional image frames 611 to 613 to be generated, thus reducing a time needed to generate the additional image frames 611 to 613.

As described above, in the case of the game played from the first-person point of view of the game user, portions of the first image frame 610 may include the foreground image 610A, the additional image frames 611 to 613, and the second image frame 620 included in the output image, may only include a relatively small change in the foreground image 610A. In the case of the racing game, the foreground image 610A may include a vehicle image in which it is assumed that the game user is driving the vehicle, and may only include a change in the movement of the steering wheel or wheels of the vehicle, and changes in images reflected by the side-view mirrors of the vehicle.

In an example embodiment, the image processor 130 may separately process the foreground image 610A and a background image in order to increase efficiency of computation. By dividing and separately processing the foreground image 610A including a relatively small change and the background image having a relatively large change, an amount of computation of the image processor 130 may be reduced, and a computation rate of the image processor 130 may be increased, thus shortening a time needed to generate the first image frame 610, the additional image frames 611 to 613, and the second image frame 620 included in the output image. In an example embodiment, the foreground image 610A and the background image may be divided by the original image processor 210 every frame, may be transmitted to the display controller 100, and may be separately stored in the buffer 120.

Figure 15:
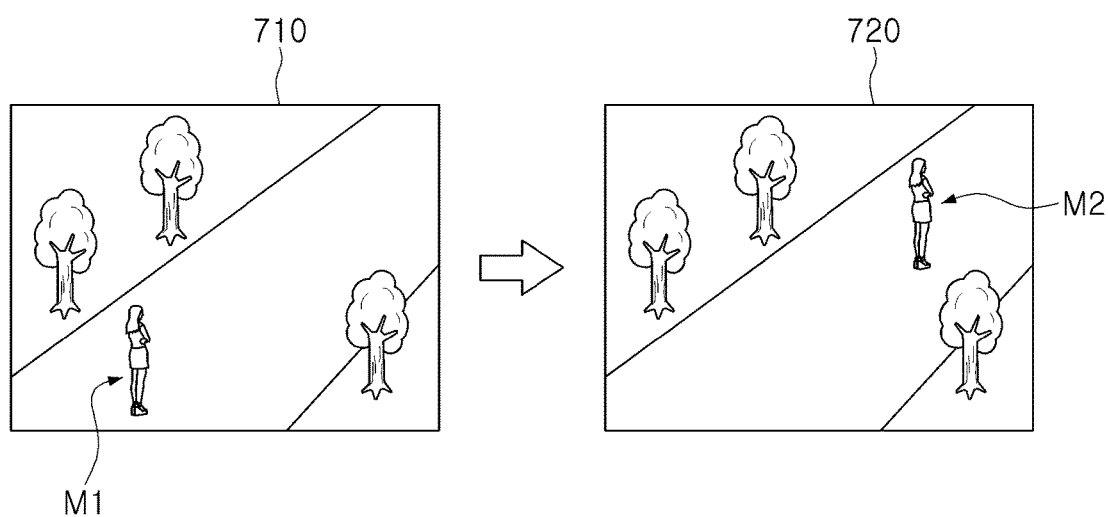
Figure 16:
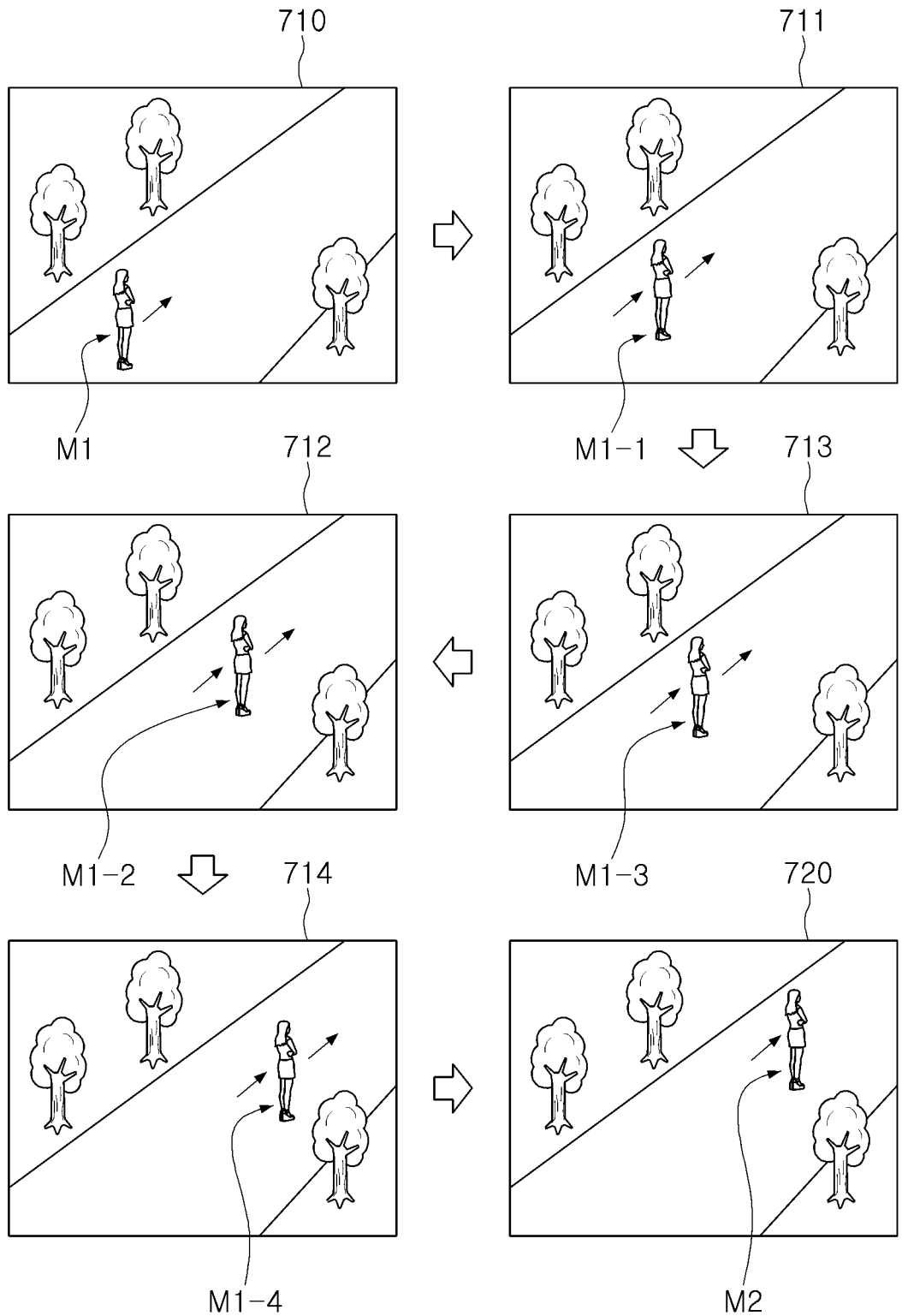

Referring next to FIGS. 15 and 16, when the user views a video, such as a movie or a drama, using the virtual reality device 10 or 20, operations of a display controller according to an example embodiment will be described.

An original image included in a movie may have a frame rate of 24 FPS. Thus, when the user views a movie using the virtual reality device 10 or 20 that may display an image close to the eyes of the user, the user may easily feel buffering or intervals between image frames, which may act as a primary reason for an increase in vertigo or fatigue of the user. In an example embodiment, additional image frames may be appropriately inserted between image frames provided every ⅟24 second in the original image included in the movie to increase a frame rate of the original image, thus reducing the fatigue and vertigo of the user.

Referring to FIG. 15, an original image included in a movie may allow a single image to be displayed every ⅟24 second. A first image frame 710 and a second image frame 720 of the original image illustrated in FIG. 15 may be sequentially displayed. In this case, a difference between the first and second image frames 710 and 720 may be recognized as image buffering by the user. Referring to FIG. 15, the location of a person may move from a first position M1 to a second position M2, and the movement may take ⅟24 second, for example, about 42 ms. The user may recognize the movement as an instant skip movement, rather than a natural movement, and a factor interfering with comfortable movie watching may thus be generated.

With reference to the example embodiment illustrated in FIG. 16, the display controller 100 according to an example embodiment may insert appropriate additional image frames 711 to 714 between the first and second image frames 710 and 720. The number of the additional image frames 711 to 714 may be appropriately changed according to a targeted frame rate of an image output to the user. The additional image frames 711 to 714 may be generated by the FRC 110, and the FRC 110 may generate the additional image frames 711 to 714 using a motion estimation (ME) technique or motion compensation (MC) technique. Referring to FIG. 16, each of locations M1-1 to M1-4 of the person in the additional image frames 711 to 714 may be a location between the first and second positions M1 and M2. Thus, the user may recognize the movement of the person occurring in the output image as a seamless and natural movement.

Various example embodiments described with reference to FIGS. 9 through 16 may be applied to the display controller 100A illustrated in FIG. 4, as well as to the display controller 100 illustrated in FIG. 3.

Figure 17:
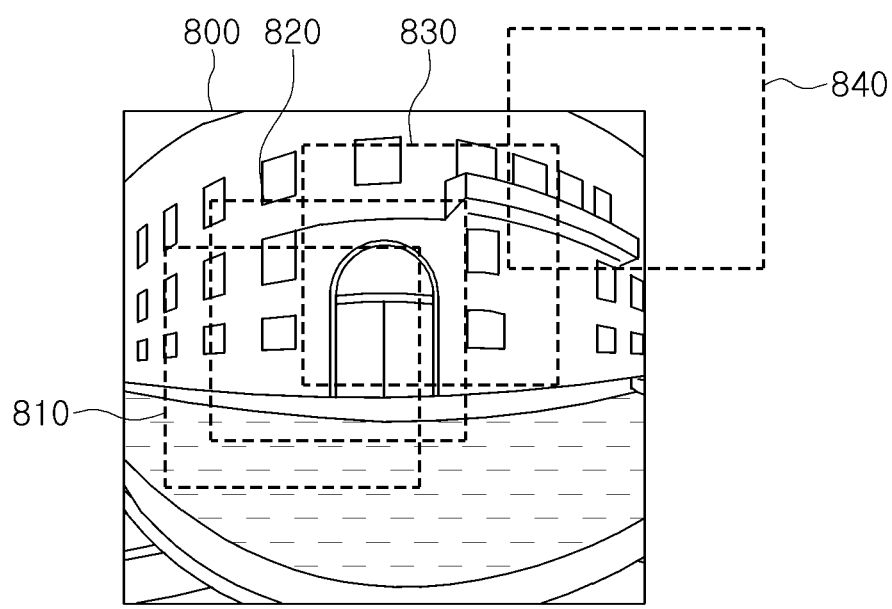

FIG. 17 is a diagram illustrating operations of a display controller according to an example embodiment. The operations of the display controller according to an example embodiment will hereinafter be described with reference to the display controller 100A illustrated in FIG. 4, for convenience of description.

As illustrated in FIG. 17, a second reference image 800 may be generated from an original image by the original image processor 210. The second reference image 800 may be larger than an output image actually displayed to the user. In addition, the second reference image 800 may have a lower resolution than that of the output image actually displayed to the user. The second reference image 800 may be stored in the buffer 120.

A first area 810 selected from the second reference image 800 may be an output image displayed to the user as a first frame. According to movement information of the user detected by the sensor 230, the area calculator 131 of the image processor 130A may determine a second frame that needs to be displayed subsequent to the first frame. The sensor 230 may sense the movement of the eyes or head of the user to generate movement information.

First, when a degree of user movements is lowest, the area calculator 131 may determine a second area 820 as a second frame. The area calculator 131 may select the second area 820 from the second reference image 800 stored in the buffer 120, and may output the selected second area 820 as the second frame.

When the degree of user movements is higher than the lowest degree thereof, the area calculator 131 may determine a third area 830 as the second frame. According to user movements, an area that may not be included in the second reference image 800 may be displayed as an output image after the second frame. In this case, the original image processor 210 may generate a new second reference image from the original image, and may store the generated new second reference image in the buffer 120. For example, according to user movements, the original image processor 210 may generate a new second reference image from the original image, and may store the generated new second reference image in the buffer 120.

In a case in which a fourth area 840 is determined as the second frame due to a very high degree of user movements, the fourth area 840 determined as the second frame may not be included in the second reference image 800. In this case, the original image processor 210 may immediately select the fourth area 840 from the original image, and may directly transmit the selected fourth area 840 to the DDI 220, thus significantly reducing a delay phenomenon that may occur during image transition. When the fourth area 840 is displayed as the second frame, the original image processor 210 may select a new second reference image from the original image, and may transmit the selected new second reference image to the FRC 110. The example embodiment described with reference to FIG. 17 may be applied to the display controller 100 according to the example embodiment of FIG. 3.

As set forth above, according to example embodiments, a display controller may convert image data having a low frame rate into image data having a relatively high frame rate. In particular, a natural image may be provided to a user who uses a virtual reality device or a display device by reflecting user movements, or front and back image frames in a process of increasing a frame rate of image data. Further, an image having a high frame rate may be stored in a buffer in advance, and an image to be output to a user may be generated with reference to the stored image and user movements to significantly reduce latency, thus reducing the fatigue or vertigo of the user and greatly lessening an image interruption phenomenon.

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

While example embodiments have been shown and described above, it will be apparent to those skilled in the art that modifications and variations could be made without departing from the scope of the present inventive concept as defined by the appended claims.

What is claimed is:

1. A display controller comprising:
   a frame rate converter configured to create a second reference image having a second frame rate higher than a first frame rate of a first reference image, based on the first reference image, the second reference image comprising a first image frame of the first reference image, a second image frame of the first reference image, and a plurality of additional image frames interposed between the first image frame and the second image frame, each of the plurality of additional image frames corresponding to one of the first image frame and the second image frame;
   a buffer configured to store the second reference image; and an image processor configured to create an output image by selecting a portion of the second reference image and increasing a resolution of the portion of the second reference image.

2. The display controller of claim 1, wherein the frame rate converter is further configured to create the second reference image by inserting each image frame of the first reference image and a corresponding plurality of additional image frames after each image frame of the first reference image.

3. The display controller of claim 2, wherein the first reference image is created by selecting the portion of an original image.

4. The display controller of claim 3, wherein the image processor is further configured to create the output image by selecting portions of the first image frame, the second image frame, and each of the corresponding plurality of additional image frames, based on user movements.

5. The display controller of claim 3, wherein the portion of the original image is selected based on user movements.

6. The display controller of claim 3, wherein the original image is received from a 360 degree camera, and each of the first reference image and the second reference image has a smaller size than the original image.

7. The display controller of claim 3, wherein the original image is a game image, and each of the first reference image and the second reference image has a smaller size than the original image.

8. The display controller of claim 7, wherein the image processor is further configured to divide the second reference image into a first area and a second area larger than the first area.

9. The display controller of claim 8, wherein the image processor is further configured to determine the second area by selecting at least portions of the first image frame, the second image frame, and each of the corresponding plurality of additional image frames, based on user movements.

10. The display controller of claim 2, wherein a first reference image size of the first reference image is a size of an original image.

11. The display controller of claim 10, wherein the frame rate converter is further configured to create the corresponding plurality of additional image frames by using at least one among a motion estimation technique and a motion compensation technique.

12. The display controller of claim 1, wherein the first reference image has a substantially same resolution with a resolution of the second reference image.

13. The display controller of claim 12, wherein the image processor is further configured to create the output image by increasing a resolution of the portion of the second reference image.

* * * * *